(12) United States Patent
Ros-Giralt

(10) Patent No.: US 9,798,588 B1
(45) Date of Patent: Oct. 24, 2017

(54) EFFICIENT PACKET FORWARDING USING CYBER-SECURITY AWARE POLICIES

(71) Applicant: Reservoir Labs, Inc., New York, NY (US)

(72) Inventor: Jordi Ros-Giralt, Newport Beach, CA (US)

(73) Assignee: Significs And Elements, LLC, New York, NY (US)

( * ) Notice: Subject to any disclaimer, the term of this patent is extended or adjusted under 35 U.S.C. 154(b) by 607 days.

(21) Appl. No.: 13/870,814

(22) Filed: Apr. 25, 2013

Related U.S. Application Data

(60) Provisional application No. 61/638,078, filed on Apr. 25, 2012.

(51) Int. Cl.
*G06F 9/50* (2006.01)

(52) U.S. Cl.
CPC ................. *G06F 9/5083* (2013.01)

(58) Field of Classification Search
CPC ................. G06F 9/5083; G06F 11/3433
See application file for complete search history.

(56) References Cited

U.S. PATENT DOCUMENTS

| | | | |
|---|---|---|---|
| 5,442,699 A | 8/1995 | Arnold et al. | |
| 5,442,797 A | 8/1995 | Casavant et al. | |
| 5,613,136 A | 3/1997 | Casavant et al. | |
| 5,742,814 A | 4/1998 | Balasa et al. | |
| 5,920,854 A | 7/1999 | Kirsch et al. | |
| 5,953,531 A | 9/1999 | Megiddo et al. | |
| 5,978,844 A * | 11/1999 | Tsuchiya | G06F 9/5083 709/221 |
| 6,006,033 A | 12/1999 | Heisch | |
| 6,018,735 A | 1/2000 | Hunter | |
| 6,038,398 A | 3/2000 | Schooler | |
| 6,131,092 A | 10/2000 | Masand | |
| 6,279,113 B1 | 8/2001 | Vaidya | |
| 6,327,699 B1 | 12/2001 | Larus et al. | |
| 6,338,057 B1 | 1/2002 | Weeks | |
| 6,651,246 B1 | 11/2003 | Archambault et al. | |

(Continued)

OTHER PUBLICATIONS

Aloul et al, Solution and Optimization of Systems of Pseudo-Boolean Consraints, IEEE Transactions on Computers, vol. 56, No. 10, Oct. 2007, pp. 1415-1424.

(Continued)

*Primary Examiner* — Chi H Pham
*Assistant Examiner* — Weibin Huang
(74) *Attorney, Agent, or Firm* — Goodwin Procter LLP

(57) ABSTRACT

For balancing load, a forwarder can selectively direct data from the forwarder to a processor according to a loading parameter. The selective direction includes forwarding the data to the processor for processing, transforming and/or forwarding the data to another node, and dropping the data. The forwarder can also adjust the loading parameter based on, at least in part, feedback received from the processor. One or more processing elements can store values associated with one or more flows into a structure without locking the structure. The stored values can be used to determine how to direct the flows, e.g., whether to process a flow or to drop it. The structure can be used within an information channel providing feedback to a processor.

27 Claims, 11 Drawing Sheets

(56) References Cited

U.S. PATENT DOCUMENTS

| | | | |
|---|---|---|---|
| 6,690,683 B1* | 2/2004 | Brunheroto | H04J 3/047 370/508 |
| 6,754,650 B2 | 6/2004 | Cho et al. | |
| 6,772,415 B1 | 8/2004 | Danckaert et al. | |
| 6,785,677 B1 | 8/2004 | Fritchman | |
| 6,792,546 B1 | 9/2004 | Shanklin et al. | |
| 6,880,087 B1 | 4/2005 | Carter | |
| 6,912,526 B2 | 6/2005 | Akaboshi | |
| 6,952,694 B2 | 10/2005 | Mathur et al. | |
| 6,952,821 B2 | 10/2005 | Schreiber | |
| 7,002,965 B1 | 2/2006 | Cheriton | |
| 7,075,926 B2 | 7/2006 | Cathey et al. | |
| 7,086,038 B2 | 8/2006 | Cronquist et al. | |
| 7,185,327 B2 | 2/2007 | Scales | |
| 7,225,188 B1 | 5/2007 | Gai et al. | |
| 7,260,558 B1 | 8/2007 | Cheng et al. | |
| 7,369,557 B1 | 5/2008 | Sinha | |
| 7,594,260 B2 | 9/2009 | Porras et al. | |
| 7,634,566 B2 | 12/2009 | Turner et al. | |
| 7,757,222 B2 | 7/2010 | Liao et al. | |
| 7,784,094 B2 | 8/2010 | Balakrishnan et al. | |
| 8,087,010 B2 | 12/2011 | Eichenberger et al. | |
| 8,108,845 B2 | 1/2012 | Little et al. | |
| 8,230,408 B2 | 7/2012 | Eng | |
| 8,250,550 B2 | 8/2012 | Luszczek et al. | |
| 8,255,890 B2 | 8/2012 | Luszczek et al. | |
| 8,307,347 B2 | 11/2012 | Austin et al. | |
| 8,825,877 B2* | 9/2014 | Kakadia | G06F 9/5083 709/201 |
| 8,850,571 B2 | 9/2014 | Staniford et al. | |
| 8,898,204 B1 | 11/2014 | Sathe et al. | |
| 8,977,648 B2 | 3/2015 | Shiell et al. | |
| 9,185,020 B2 | 11/2015 | Ezick et al. | |
| 2002/0021838 A1 | 2/2002 | Richardson et al. | |
| 2003/1009765 | 5/2003 | Roediger at al | |
| 2004/0034754 A1 | 2/2004 | Schreiber | |
| 2004/0068501 A1 | 4/2004 | McGoveran | |
| 2005/0114700 A1 | 5/2005 | Barrie et al. | |
| 2006/0048121 A1 | 3/2006 | Blainey et al. | |
| 2006/0048123 A1 | 3/2006 | Martin | |
| 2006/0085858 A1 | 4/2006 | Noel et al. | |
| 2007/0033367 A1 | 2/2007 | Sakarda et al. | |
| 2007/0074195 A1 | 3/2007 | Liao et al. | |
| 2007/0192861 A1 | 8/2007 | Varghese et al. | |
| 2008/0010680 A1 | 1/2008 | Cao et al. | |
| 2009/0037889 A1 | 2/2009 | Li et al. | |
| 2009/0083724 A1 | 3/2009 | Eichenberger et al. | |
| 2009/0119677 A1 | 5/2009 | Stefansson et al. | |
| 2009/0259997 A1 | 10/2009 | Grover et al. | |
| 2009/0307673 A1 | 12/2009 | Eichenberger et al. | |
| 2010/0050164 A1 | 2/2010 | Van De Waerdt et al. | |
| 2010/0162225 A1 | 6/2010 | Huang et al. | |
| 2010/0281160 A1 | 11/2010 | Ros-Giralt et al. | |
| 2011/0035805 A1 | 2/2011 | Barkan et al. | |
| 2011/0078318 A1* | 3/2011 | Desai | G06F 9/5083 709/228 |
| 2011/0225588 A1 | 9/2011 | Pollock et al. | |
| 2011/0289206 A1* | 11/2011 | Vecera | G06F 9/5083 709/224 |
| 2013/0268563 A1 | 10/2013 | Shiell et al. | |
| 2013/0343181 A1 | 12/2013 | Stroud et al. | |
| 2015/0195155 A1 | 7/2015 | Seol et al. | |

OTHER PUBLICATIONS

Buluc et al, Parallel Sparse Matrix—Matrix Multiplication and Indexing: Implementation and Experiments, SIAM Journal of Scientific Computing (SISC), 2012.
Chang et al, Parallel sparse supports for array intrinsic functions of Fortran 90, J. Supercomput. 18(3):305-339, (2001).
Davis, Direct Methods for Sparse Linear Systems. SIAM, 2006 (100 pgs.).
Franzie et al, Effcient Solving of Large Non-linear Arithmetic Constraint Systems with Complex Boolean Structure, JSAT, Journal on Satisfiability, Boolean Modelling and Computation, vol. 1 (3-4): 2007, pp. 209-236.
Gundersen et al, Sparsity in higher order methods for unconstrained optimization, Optimization Methods and Software, 27(2):275-294 (2012).
Gustavson, Two Fast Algorithms for Sparse Matrices: Multiplication and Permuted Transposition, ACM Transactions on Mathematical Software, 4(3): 250-269, 1978.
Kolda et al, Scalable Tensor Decompositions for Multiaspect Data Mining, in ICDM 2008: Proceedings of the 8th IEEE International Conference on Data Mining, Dec. 2008, pp. 363-372.
Lathauwer et al, On the Best Rank-1 and Rank-(R1,R2, ..., RN) Approximation of Higher-Order Tensors, SIAM J. Matrix Anal. Appl., 21:1324-1342, Mar. 2000.
Lin et al, Efficient data compression methods for multidimensional sparse array operations based on the EKMR scheme, IEEE Trans. Comput., 52(12):1640-1646, (2003).
Lin et al., Efficient Representation Scheme for Multidimensional Array Operations, IEEE Transactions on Computers, 51:327-345, 2002.
Nieuwenhuis, Solving SAT and SAT Modulo Theories: From an Abstract Davis-Putnam-Logemann-Loveland Procedure to DPLL(T), Journal of the ACM (JACM) JACM vol. 53 Issue 6, Nov. 2006, pp. 937-977.
Vera et al, An Accurate Cost Model for Guiding Data Locality Transformations—Politecnica de Catalunya—Barcelona University—Sep. 2005.
Ahmed et al, Synthesizing Transformations for Locality Enhancement of Imperfectly-nested Loops Nests, ACM ICS 2000, pp. 141-152.
Ahmed et al, Tiling Imperfectly-nested Loop Nests, IEEE 2000,14 pgs.
Aho et al, Compilers: Principles, Techniques, & Tools, 2nd Edition, 2006, pp. 173-186.
Aho et al, Efficient String Matching: An Aid to Bibliographic Search, Communications of the ACM, vol. 18, No. 6, Jun. 1975, pp. 333-340.
Aigner et al, An Overview of the SUIF2 Compiler Infrastructure, Computer Systems Laboratory, Stanford University, 1999, pp. 1-14.
Aldwairi et al, Configurable String Matching Hardware for Speeding Up Intrusion Detection, ACM SIGARCH Computer Architecture News, Vo. 33, No. 1, Mar. 2005, pp. 99-107.
Allen et al, Conversion of Control Dependence to Data Dependence, ACM 1983, pp. 177-189.
Ancourt et al, Scanning Polyhedra with DO Loops, Proceedings of the third ACM SIGPLAN symposium on Principles and practice of parallel programming, Apr. 21-24, 12 pgs. 1991.
Appel, A.W., Deobfuscation is in NP, Princeton University, Aug. 21, 2002, 2 pgs.
Ayers et al, Aggressive Inlining, PLDI '92 Las Vegas, NV, USA.
Ball et al, Branch Prediction for Free, Technical Report #1137, University of Wisconsin, 1993, 29 pgs.
Barak et al, On the (Im)possibility of Obfuscating Programs, Advances in Cryptology, CRYPTO 2001, vol. 2139, pp. 1-18.
Barthou et al, Maximal Static Expansion, International Journal of Parallel Programming, vol. 28, No. 3, 2000, 20 pgs.
Bastoul et al, Putting Polyhedral Loop Transformations to Work, INRIA, No. 4902, Jul. 2003.
Bastoul, C., Generating Loops for Scanning Polyhedra: CLooG User's Guide, First Version, Rev. 1.6, Apr. 8, 2004, pp. 1-30.
Bastoul, Code Generation in the Polyhedral Model Is Easier Than You Think, Proceedings of the 13th International Conference on Parallel Architecture and Compilation Techniques, 2004.
Bastoul, Efficient Code Generation for Automatic Parallelization and Optimization, Proceedings of the Second International Symposium on Parallel and Distributed Computing, 2003.
Bednara et al, Synthesis for FPGA Implementations From Loop Algorithms, In Proceedings ofthe Int. Conf. on Engineering of Reconfigurable Systems and Algorithms (ERSA), Jun. 2001.
Berkelaar et al, The IpSolve Package, Sep. 21, 2007, pp. 1-9.

(56) References Cited

OTHER PUBLICATIONS

Bik et al, Implementation of Fourier-Motzkin Elimination, Technical Report 94-42, Department. of Computer Science, Leiden University, 1994.
Bondhugula et al, A Practical and Fully Automatic Polyhedral Program Optimization System,OSU OSU-CISRC-10/07-TR70; Dec. 14, 2007.
Bondhugula et al, A Practical Automatic Polyhedral Parallelizer and Locality Optimizer, PDLI '08, Jun. 7-13, 2008.
Bondhugula et al, Affine Transformations for Communication Minimal Parallelization and Locality Optimization of Arbitrarily Nested Loop Sequences, OSU CSE Technical Report, OSU-CISRC-5/07/TR43, pp. 1-30.
Bondhugula et al, Automatic Mapping of Nested Loops to FPGAs, OSU, Mar. 19, 2007.
Bondhugula et al, Toward Effective Automatic Parallelization for Multi\par core Systems, In proceeding of 22nd IEEE International Symposium on Parallell and Distributed Processing, (IPDPS 2008). Miami, Florida USA, Apr. 14, 2008.
Boulet et al, (Pen)-ultimate tiling?, Laboratoire de l'Informatique du Parallelisme, Research Report No. 93-96, Nov. 1993, pp. 1-17.
Boulet et al, Scanning polyhedra without Do-loops, Parallel Architectures and Compilation Techniques, 1998, Proceedings 1998 International Conference on Oct. 12-18, 1998, pp. 4-11.
Briggs et al, Effective Partial Redundancy Elimination, Sigplan PLDI, Jun. 1994, pp. 1-12.
Brumley et al, Towards Automatic Generation of Vulnerability-Based Signatures, Proceedings of the 2006 IEEE Symposium on Security and Privacy, pp. 1-15.
Burger et al, Scaling to the End of the Silicon with EDGE Architectures, Computer, Jul. 2004, pp. 44-55.
Burke et al, Flow-Insensitive Interprocedural Alias Analysis in the Presence of Pointers, Lecture Notes in Computer Science, Proceedings from the 7th International Workshop on Languages and Compilers for Parallel Computing, vol. 892, 1995, 18 pgs.
Cifuentes, C., A Structuring Algorithm for Decompilation, XIX Conferencia Latinoamericana de Inforamatica, Buenos Aires, Argentina, Aug. 2-6, 1993, pp. 267-276.
Cifuentes,Structuring Decompiled Graphs, Department of Computer Science, University of Tasmania, 1994, 15 pgs.
Clauss et al, Automatic Memory Layout Transformations to Optimize Spatial Locality in Parameterized Loop Nests, ACM SIGARCH Computer Architecture News, vol. 28, No. 1, 2000, pp. 1-9.
Clauss et al, Deriving Formulae to Count Solutions to Parameterized Linear Systems using Ehrhart Polynomials: Applications to the Analysis of Nested-Loop Programs, Apr. 10, 1997.
Clearspeed—Accelerator Technology Primer, ClearSpeed Technology Primer, ClearSpeed Technology, Inc., 2006.
Clearspeed—ClearSpeed Programming Model: An introduction, ClearSpeed Technology Inc. 2007.
Clearspeed—ClearSpeed Programming Model: Card-side Libraries, ClearSpeed Technology Inc. 2007.
Clearspeed—ClearSpeed Programming Model: Optimizing Performance, ClearSpeed Technology Inc. 2007.
Clearspeed—CSX Processor Architecture Whitepaper, ClearSpeed Technology Plc., 2006.
Clearspeed—Introduction to ClearSpeed Acceleration, ClearSpeed Technology Inc., 2007, 27 pages.
Clearspeed—Introduction to ClearSpeed Acceleration, Powerpoint presentation, ClearSpeed Technology Plc, 2007, 133 pgs.
Clearspeed—Overview of Architecture: System Level (host) Architecture and ClearSpeed Architecture, ClearSpeed Technology Inc., 2007.
Clearspeed Introductory Programming Manual—The ClearSpeed Software Development Kit, ClearSpeed Technology Inc. 2007.
Clearspeed Programming Model: Case Study, ClearSpeed Technology Inc., 2007.
Clearspeed Technical Training: Software Development, ClearSpeed Technology Inc., 2007.
Click et al, A Simple Graph-Based Intermediate Representation, ACM IR'95, 1995, pp. 35-49.
Click, C., Global Code Motion Global Value Numbering, ACM SIGPLAN' 95, pp. 246-257, 1995.
Collard et al, Automatic Generation of Data Parallel Code, Proceedings of the Fourth International Workshop on Compilers for Parallel Computers, Dec. 1993.
Collard et al, Fuzzy Array Dataflow Analysis, ACM Principles and Practice of Parallel Programming, PPOpp'95, Jul. 1995, 10 pgs.
Collberg et al, A Taxonomy of Obfuscating Transformations, Technical Report 148, Department of Computer Science, University of Auckland, Jul. 1997. http://www.cs.auckland.ac.nz/-Ccollberg/Research/Publications/CollbergThomborsonLow97a.
Collberg et al, Manufacturing Cheap, Resilient, and Stealthy Opaque Constructs, POPL 98, San Diego, CA 1998.
Cooper et al, Operator Strength Reduction, ACM Transactions on Programming Languages and Systems, vol. 23, No. 5, pp. 603-625, Sep. 2001.
Cooper et al, SCC-Based Value Numbering, CRPC-TR95636-S, Oct. 1995, pp. 1-12.
Cousot et al, Abstract Interpretation: A Unified Lattice Model for Static Analysis of Programs by Construction or Approximation of Fixpoints, Conference Record of the Fourth ACM Symposium on Principles of Programming Languages, Jan. 17-19, 1977, 16 pgs.
Cytron et al, Efficiently Computing Static Single Assignment Form and The Control Dependence Graph, Mar. 7, 1991, pp. 1-52.
Darte et al, Algorithm, Chapter 5: Parallelism Detection In Nested Loops, pp. 193-226.
Darte et al, Automatic parallelization based on multi-dimensional scheduling, Research Report No. 94-24, Laboratoire de l'Informatique de Parallelisme, 1994, pp. 1-34.
Darte et al, Lattice-Based Memory Allocation, ACM Cases'03, pp. 298-308, 2003.
Darte et al, Lattice-Based Memory Allocation, IEEE Transactions on Computers, vol. 54, No. 10, Oct. 2005, pp. 1242-1257.
Darte et al, Lattice-Based Memory Allocation, Research Report No. 2004-23, Apr. 2004, 1-43.
Darte et al, Revisiting the decomposition of Karp, Miller and Winograd, Parallel Processing Letters, 1995.
Ezick et al, Alef: A SAT Solver for MPI-Connected Clusters, Technical Report, Aug. 13, 2008, 21 pgs.
Featurier, Some efficient solutions to the affine scheduling problem Part I One-dimensional Time, Laboratoire MASI, Institute Blaise Pascal, Universite de Versailles St-Quentin, Apr. 23, 1993.
Feautrier et al, Solving Systems of Affine (In)Equalities: PIP's User's Guide, 4th Version, rev. 1.4, Oct. 18, 2003, pp. 1-25.
Feautrier, P., Array Expansion, Universite de Versailles St-Quentin, Jul. 1988, pp. 1-20.
Feautrier, P., Dataflow Analysis of Array and Scalar References, Int. J. of Parallel Programming, vol. 20, No. 1, 1991, pp. 1-37.
Feautrier, P., Parametric Integer Programming, RAIRO Operationnelle, vol. 22, Sep. 1988, pp. 1-25.
Feautrier, P., Some efficient solutions to the affine scheduling problem, Part II, Multidimensional Time, IBP/MASI, No. 92.78, 1992, pp. 1-28.
Ferrante et al, The Program Dependence Graph and Its Use in Optimization, ACM Transactions on Programming Languages and Systems, vol. 9, No. 3, Jul. 1987, pp. 319-349.
Franke et al, Compiler Transformation of Pointers to Explicit Array Accesses in DSP Applications, Institute for Computing Systems Architecture (ICSA), University of Edinburgh.
Gautam et al, The Z-Polyhedral Model, SIGPLAN Symp. on Principles and Practice of Parallel Programming, pp. 237-248, New York, NY, USA, 2007.
George et al, Iterated Register Coalescing, ACM Transactions on Programming Languages and Systems, vol. 18, No. 3, May 1996, pp. 300-324.
Ghosh et al, Cache Miss Equations: A Compiler Framework for Analyzing and Tuning Memory Behavior, ACM Transactions on Programming Languages and Systems, vol. 21, No. 4, Jul. 1999, pp. 702-745.

(56) References Cited

OTHER PUBLICATIONS

Griebl et al, Code Generation in the Polytope Model, pact, pp. 106, Seventh International Conference on Parallel Architectures and Compilation Techniques (PACT'98), 1998.
Griebl et al, Forward Communication Only Placements and their Use for Parallel Program Construction, University of Passau.
Griebl et al, Space-Time Mapping and Tiling: A Helpful Combination, Concurrency and Comput.: Pract. Exper. 2004, 16:221-246.
Griebl, Automatic Parallelization of Loop Programs for Distributed Memory Architectures, Fakultat fur Mathematik und Informatik, Jun. 2, 2004.
Griebl, On the Mechanical Tiling of Space-Time Mapped Loop Nests, Fakultat fur Mthemetik und Informatik, Universitat Passau, Germany.
Gu et al, Symbolic Array Dataflow Analysis for Array Privatization and Program Parallelization, Proceedings of Supercomputing '95, pp. 1-19, 1995.
Gustafson et al, ClearSpeed—Whitepaper: Accelerating the Intel® Math Kernel Library, ClearSpeed Technology Inc., 2006.
Heintze et al, Ultra-fast Aliasing Analysis Using CLA: A Million Lines of C Code in a Second, ACM SIGPLAN Notices, vol. 36, No. 5, 2001, 10 pgs.
Intel® QuickAssist Technology Accelerator Abstraction Layer (AAL), White Paper, Intel® Corporation, 2007, 8 pgs.
International Preliminary Report on Patentability dated Mar. 31, 2011 for PCT Application No. PCT/US2009/057194.
International Preliminary Report on Patentability dated Oct. 27, 2011 for PCT Application No. PCT/US2010/031524.
International Preliminary Report on Patentability dated Jan. 6, 2009 for PCT Application No. PCT/US2007/72260.
International Preliminary Report on Patentability dated Nov. 1, 2011 for PCT Application No. PCT/US2010/033049.
International Search Report and the Written Opinion dated Jan. 17, 2008 for PCT Application No. PCT/US2007/72260.
International Search Report and the Written Opinion dated Mar. 18, 2010 for PCT Application No. PCT/US2009/057194.
International Search Report and the Written Opinion dated Nov. 26, 2010 for PCT Application No. PCT/US2010/031524.
International Search Report and the Written Opinion dated Dec. 1, 2010 for PCT Application No. PCT/US2010/033049.
Irigoin et al, Supernode Partitioning, Proceedings of the 15th Annual ACM SIGACT-SIGPLAN Symposium on Principles of Programming Languages, San Diego, CA, Jan. 1988.
JGAP Frequently Asked Questions, Sourceforge.net, pp. 1-61.
Jimenez et al, Register Tiling in Nonrectangular Iteration Spaces, ACM Transactions on Programming Languages and Systems, vol. 24, No. 4, pp. 409-453, Jul. 2002.
Jonsson et al., "Verifying Safety Properties of a Class of Infinite-State Distributed Algorithms", Lecture Notes in Computer Science, 1995, vol. 939, pp. 42-53.
Kandemir et al, Optimizing Spatial Locality in Loop Nests using Linear Algebra, Proc. 7th International Workshop on Compliers for Parallel Computers, Sweden Jun. 1998.
Kelly et al, Code Generation for Multiple Mappings, frontiers, Fifth Symposium on the Frontiers of Massively Parallel Computation (Frontiers '95), 1995, pp. 1-11.
Kelly, W. A., Ph.D. Dissertation, Optimization within a Unified Transformation Framework, Dec. 8, 1996, pp. 1-89.
Kildall, G.A., A Unified Approach to Global Program Optimization, Annual Symposium on Principles of Programming Languages, Proceedings of the 1st annual ACM SIGACT-SIGPLAN symposium on Principles of programming languages, pp. 194-206, 1973.
Knoop et al, Partial Dead Code Elimination, Conference on Programming Language Design and Implementation, Proceedings of the ACM SIGPLAN 1994 conference on Programming language design and implementation, pp. 147-158, 1994.
Kodukula et al, An Experimental Evaluation of Tiling and Shacking for Memory Hierarchy Management, ACM ICS'99, 1999, pp. 482-491.

Lam, M., Software Pipeline: An Effective Scheduling Technique for VLIW Machines, Proceedings of the SIGPLAN '88 Conference on Programming Language Design and Implementation, Jun. 22-24, 1988, pp. 318-328.
Landi, W. Undecidability of Static Analysis, From ACM Letters on Programming Languages and Systems, vol. 1, No. 4, 1992, pp. 1-17.
Le Verge, H., A Note on Chernikova's Algorithm, Research Report, Jul. 27, 1994, pp. 1-25.
Lengauer et al, A Fast Algorithm for Finding Dominators in a Flowgraph, ACM Transaction on Programming Languages and Systems, vol. 1, No. 1, Jul. 1979, pp. 121-141.
Lethin et al, Mapping Loops for the ClearSpeed Processor Using the R-Stream Compiler, Feb. 4, 2008.
Lethin et al, R-Stream: A Parametric High Level Compiler, Reservoir Labs, Inc., 2 pgs.
Lethin et al, The R-Stream 3.0 Compiler, Dec. 18, 2007.
Lethin et al, The R-Stream 3.0 Compiler, Feb. 4, 2008.
Lethin et al, The R-Stream 3.0: Polyheadral Mapper, XPCA Review, Feb. 6, 2007.
Lethin, Software Tools to Optimize BMD Radar Algorithms to COTS Hardware—Final Report, Sep. 12, 2007.
Lim et al, Blocking and Array Contraction Across Arbitrarily Nested Loops Using Affine Partitioning, ACM PPOPP'01, 2001, pp. 1-10.
Lim et al, Maximizing Parallelism and Minimizing Synchronization with Affine Transforms, 24th Annual ACM SIGPLAN-SIGACT Symposium on Principles of Programming Languages, Paris, France, Jan. 1997.
Loechner et al, Precise Data Locality Optimization of Nested Loops, The Journal of Supercomputing, 21, pp. 37-76, 2002.
Mahajan et al., "Zchaff2004: An Efficient SAT Solver", LNCS, 2005, pp. 360-375.
Maydan et al, Array Data-Flow Analysis and its Use in Array Privatization, ACM-20th PoPL-1, 1993, pp. 2-15.
McWhirter et al, Normalised Givens Rotations for Recursive Least Squares Processing, VLSI Signal Processing, VIII, 1995. IEEE Signal Processing Society [Workshop on], 1995, pp. 323-332.
Megiddo et al, Optimal Weighted Loop Fusion for Parallel Programs, ACM Symposium on Parallel Algorithms and Architectures archive Proceedings of the ninth annual ACM symposium on Parallel algorithms and architectures, pp. 282-291, 1997.
Meister et al, Optimizing and Mapping Tool Chain for FPGA Programming—Final Report Phase 1 SBIR Project, Sep. 28, 2007.
Meister et al, Static Software Tools to Optimize BMD Radar Algorithms to COTS Hardware, Quarterly Report #1, 2008, pp. 1-22.
Meister, B. Stating and Manipulating Periodicity in the Polytope Model. Applications to Program Analysis and Optimization, Universite Louis Pasteur Strasbourg, 2004, pp. 1-138.
Nookala et al, A Library for Z-Polyhedral Operations, Publication Interne No. 1330, IRISA, Publication No. 1330, May 2000, pp. 1-29.
Pop et al, Fast Recognition of Scalar Evolutions on Three-Address SSA Code, CRI/ENSMP Research Report, A/354/CRI, Apr. 1, 2004.
Pop et al, Induction Variable Analysis with Delayed Abstractions, ACM Transactions on Architecture and Code Optimization, vol. V, No. N, pp. 1-30, Aug. 2005.
Pugh, W. The Omega Test: a fast and practical integer programming algorithm for dependence analysis, ACM, Aug. 1992, pp. 1-19.
Quillere et al, Generation of Efficient Nested Loops from Polyhedra, 2000 Kluwer Academic Publishers, 2000.
Quillere et al, on Code-Generation in the Polyhedral Model, 10 pgs.
Quinton et al, On Manipulating Z-polyhedra, IRISA, Publication Interne No. 1016, Jul. 1996.
Quinton et al, The Mapping of Linear Recurrence Equations on Regular Arrays, Journal of VLSI Signal Processing, vol. 1, 35 pgs. (1989).
Rabinkin et al, Adaptive Array Beamforming with Fixed-Point Arithmetic Matrix Inversion using Givens Rotations, Proc. SPIE vol. 4474, 2001, pp. 294-305.
Rau, B. R., Iterative Modulo scheduling: An Algorithm for Software Pipelining Loops, ACM MICRO, 1994, pp. 63-74.
Reconfigurable Application-Specific Computing User's Guide, 2007, pp. 1-257.

(56) References Cited

OTHER PUBLICATIONS

Renganarayana, et al, A Geometric Programming Framework for Optimal Multi-Level Tiling, Conference on High Performance Networking and Computing, Proceedings of the 2004 ACM/IEEE conference on Supercomputing, 2004, 14 pgs.

Reservoir Labs, Inc., Optimizing and Mapping Tool Chain for FPGA Programming, Phase II Proposal, Proposal No. D2-0627, 40 pgs.

Reservoir Labs, Software Tools to Optimize BMD Radar Algorithms to COTS Hardware: Phase II Proposal, Topic No. MDA06-031, Proposal No. B2-1415.

Ros-Giralt et al, Generation of High-Performance Protocol-Aware Analyzers with Applications in Intrusion Detection Systems, Reservoir Labs, 8 pgs.

Ros-Girolt et al, Compilation and Optimization of Protocol Analyzers for High-Speed Network Intrusion Prevention, High Performance Networks / High-Speed Network Security Systems, Topic No. 41b, Reservoir Labs, Inc. 2009, pp. 1-54.

Sankaralingam et al, Distributed Microarchitectural Protocols in the TRIPS Prototype Processor, International Symposium on Microarchitecture, Proceedings of the 39th Annual IEEE/ACM International symposium on Microarchitecture, 2006, 12 pgs.

Schreiber et al, Near-Optimal Allocation of Local Memory Arrays, HP Laboratories Palo Alto, HPL-2004-24, Feb. 17, 2004.

Schwartz et al, VSIPL 1.1 API, 2002, pp. 1-739.

Seghir et al, Counting Points in Integer Affine Transformation of Parametric Z-polytopes, Research report, Universite Louis Pasteur, LSIIT (UMR CNRS 7005), Mar. 2007, pp. 1-24.

Seghir et al, Memory Optimization by Counting Points in Integer Transformation of Parametric Polytopes, ACM CASES'06, 2006, pp. 74-82.

Simpson, L. T., Thesis, Value-Driven Redundancy Elimination, Rice University, 1996, pp. 1-150.

Song et al, A Compiler Framework for Tiling Imperfectly-Nested Loops, Languages and Compilers for Parallel Computing, vol. 1863, 2000, pp. 1-17.

Springer et al, An Architecture for Software Obfuscation—Final Technical Report for Phase 1 SBIR, Jul. 30, 2007.

Springer et al, An Architecture for Software Obfuscation, PowerPoint presentation, 2007.

The Cell Roadmap, Published on PPCNUX at http://www.ppcnux.com/?q=print/6666.

The Polylib Team, Polylib User's Manual, Apr. 24, 2002, pp. 1-44.

Touati et a, Early Control of Register Pressure for Software Pipelined Loops, In Proceedings of the International Conference on Compiler Construction (CC), Warsaw, Poland, Apr. 2003. Springer-Verlag, 15 pgs.

Tu et al, Automatic Array Privatization, Lecture Notes in Computer Science, vol. 1808, 2001, 22 pgs.

Tu, P., Thesis, Automatic Array Privatization and Demand-Driven Symbolic Analysis, University of Illinois, 1995, pp. 1-144.

Udupa et al, Deobfuscation—Reverse Engineering Obfuscated Code, Proceedings of the 12th Working Conference on Reverse Engineering (WCRE'05), 10 pgs. 2005.

Vangal et al, An 80-Tile 1.28TFLOPS Network-on-Chip in 65Nm CMOS, ISSCC 2007, Session 5, Microprocessors/5.2, 3 pgs.

Vasilache et al, Alef: A SAT Solver for MPI-Connected Clusters, Reservoir Labs, 6 pgs.

Vasilache et al, Polyhedral Code Generation in the Real World, Compiler Construction, vol. 3923, 2006, 15 pgs.

Vasilache, Scalable Program Optimization Techniques in the Polyhedral Model, Thesis, Universite de Paris-SUD, UFR Scientifique d'orsay Inria Futures, Sep. 28, 2007.

Verdoolaege et al, Counting Integer Points in Parametric Polytopes using Barvinkok's Rational Functions, Algorithmica, 2007, pp. 1-33.

Wang, C., Dissertation—A Security Architecture for Survivability Mechanisms, University of Virginia, 2000, pp. 1-209.

Wegman et al, Constant Propagation with Conditional Branches, ACM Transactions on Programming Languages and Systems, vol. 13, No. 2, Apr. 1991, pp. 181-210.

Weise et al, Value Dependence Graphs: Representation Without Taxation, Annual Symposium on Principles of Programming Languages, Proceedings of the 21st ACM SIGPLAN-SIGACT symposium on Principles of programming languages, 1994, 14 pgs.

Whaley et al, An Efficient Inclusion-Based Points-To Analysis for Strictly-Typed Languages, Lecture Notes in Computer Science, vol. 2477, 2002, 16 pgs.

Wilde, D. K., A Library for Doing Polyhedral Operations, IRISA, Publication No. 785, 1993, pp. 1-48.

Wolf et al, A Data Locality Optimizing Algorithm, Proceedings of the ACM SIGPLAN '91 Conference on Programming Language Design and Implementation, Jun. 26-28, 1991, pp. 30-44.

Wu et al, Static Branch Frequency and Program Profile Analysis, 27th IEEE/ACM International Symposium on Microarchitecture (MICRO-27), 1994, 11 pgs.

Xue et al, Enabling Loop Fusion and Tiling for Cache Performance by Fixing Fusion-Preventing Data Dependences, Proceedings of the 2005 International Conference on Parallel Processing (ICPP'05), 2005, pp. 1-9.

Xue, On Tiling as a Loop Transformation, Department of Mathematics, Statistics and Computing Science, University of New England, Australia, 15 pgs.

\* cited by examiner

_US 9,798,588 B1_

EFFICIENT PACKET FORWARDING USING CYBER-SECURITY AWARE POLICIES

CROSS REFERENCE TO RELATED APPLICATIONS

This application is related to and claims the benefit of priority to U.S. Provisional Patent Application Ser. No. 61/638,078 filed on Apr. 25, 2012, the entirety of which is hereby incorporated by reference.

GOVERNMENT INTERESTS

Portions of this invention were made with U.S. Government support under contract/instrument Department of Energy SBIR DE-SC0004400 and DE-SC0006343. The U.S. Government has certain rights in the invention.

FIELD OF THE INVENTION

The present invention generally concerns multiprocessor systems. More particularly, the invention concerns a system and its methods for forwarding flows, e.g., of packets, across a communication network using cyber-security aware policies.

BACKGROUND OF THE INVENTION

In any network-based information system, there exist two basic functions: (1) moving of data from one node to another and (2) processing of such data. These two functions—being different from each other in their own nature—are generally mapped onto two fundamentally different types of resources which we will herein refer as the forwarders (capable of moving data) and the processors (capable of processing data), respectively. For instance, in the XV century, kingdoms taking the role of data processors communicated with each other using various types of forwarding resources such as boats or horses. More in modern times, computer hosts acting as data processors exchange information with each other using networks of forwarding nodes consisting of routers or switches.

A main objective in such networked systems resides in the identification of optimal forwarding policies that maximize the total amount of data processed by the system per unit of time—commonly referred as the throughput of the system. Generally speaking, such objective can be met by conveying an optimal amount of feedback from the processors to the forwarders, which is then used by the latter to decide how data is forwarded. This concept is illustrated in FIG. 1, where the processor node 105 shares part of its output with the forwarder node 104, which in turn uses such feedback 110 to execute a locally optimal forwarding decision 107/109. The amount of information fed back 110 to the forwarders defines a continuum of possible designs: on one edge of this continuum, if no feedback at all is provided, the forwarders can only implement static forwarding policies, which in general are sub-optimal for systems dealing with a dynamic input; on the other edge, all the processing output generated from the processors is fed back to the forwarder, effectively replicating the processing function onto the forwarder and therefore breaking the nature of the networked architecture. In general, an optimal trade-off will therefore be found somewhere between these two limits.

FIG. 2 presents an equivalent interpretation of this trade-off based on its cost analysis: a certain budget has to be distributed amongst the forwarder 201 and the processor nodes 202; the curve 204 corresponds to the set of possible designs derived by making such allocation and the cost isolines 203 represent lines of equal cost; with this configuration, the optimal design will be located where the curve of designs 204 is tangent to a cost isoline.

SUMMARY OF THE INVENTION

Various embodiments described herein present new methods for the identification of such optimal trade-offs in the context of systems dedicated to the processing of cyber-security information. In particular, various embodiments can address the optimization problem introduced above. This is achieved by, in part, providing an architecture that is divided into two types of functional nodes: forwarders, which have the capability of moving data from one node to another; and processors, which have the capability of processing data to generate meaningful information. Forwarders and processors can be grouped together to form a higher level of functional abstraction called information processing cells.

This architecture provides techniques to optimize the data and information workflow between forwarders and processors with the objective to maximize the performance of the information processing cell they are part of.

In one embodiment, a new queuing algorithm—referred as Tail Early Dropping (TED) Queuing—is presented which is designed to track an optimal trade-off inside the continuum of possible forwarding versus processing allocations. While the algorithm can accommodate a large variety of targets, in one exemplary embodiment TED is used to minimize the number of cache misses in the system while maximizing the degree of information entropy fed into the processing nodes.

In yet another embodiment, a new data structure—referred as the lock-free low false negatives (LF−) table—is presented with the following properties:
 (1) it can be concurrently written and read by multiple writers and readers, respectively;
 (2) it does not require locks to ensure the correctness of its state;
 (3) it can tolerate a low probability of false negatives but not false positives.

In an exemplary embodiment, the problem of arbitrarily scaling up the performance of the cyber-security system is resolved using a fractal-like architecture where nodes at level L are functionally identical to nodes at level L−1 but with higher processing capability. In one embodiment, such architecture can be mapped onto a variety of processing+forwarding levels such as those made by processes+software IPC (inter-processor communication), cores+shared memory, processors+system buses, hosts+IO ports, and clusters+switching fabrics.

In yet another embodiment, the fractal architecture in conjunction with the TED queuing algorithm and the LF− data structure are used to create a high-performance cell with both forwarding and processing capabilities constituting a basic optimized unit of processing in the overall architecture.

Accordingly, in one aspect, various embodiments feature an article of manufacture, a method and/or a device (a cell) that facilitate load balancing. The cell includes a processor, a forwarder, a data channel, and an information channel. The processor and the forwarder can be a formed by suitably configuring one or more processing elements, e.g., using the computer readable instructions stored on the article of manufacture. The data an information channels can be formed using communication links and memory, and the information channel can receive feedback at the forwarder from the processor.

The forwarder is adapted to: (i) selectively direct data from the forwarder to the processor via the data channel, according to a loading parameter of the cell, and (ii) adjust the loading parameter based on, at least in part, the received feedback. For example, the data can be forwarded to the processor, e.g., for processing, if the loading parameters takes on one value, and may not be forwarded to the processor if the loading parameter takes on a different value. In some embodiments, the forwarder is adapted to selectively direct data by forwarding data to the processor, transforming data and forwarding transformed data to a node different than the processor, dropping the data, or a combination of two of these alternatives.

The loading parameter can represent a property of the cell and/or data such as congestion at the processor, an amount of information associated with a data unit, etc. The forwarder may be adapted to adjust the loading parameter by decreasing the loading parameter to cause reduction in congestion at the processor. Alternatively or in addition, the forwarder may increase the loading parameter to cause increase in an amount of information processed at the processor.

In some embodiments, the forwarder is adapted to receive a flow. Typically, the received flow includes a sequence of N data units indexed from [0, N−1]. Each data unit includes an amount of information, and at least one data unit having a smaller index, e.g., d[i], includes a greater amount of information than another data unit having a greater index, e.g., d[j]. In the flow, typically the data units are received at the forwarder in the order of their indices, i.e., the data units having smaller indices (e.g., index i) generally arrive before the data units having a greater index (e.g., index j). The loading parameter is adjusted such that the data unit d[i] is forwarded to the processor and the data unit d[j] is not forwarded to the processor. This can cause the early arriving data unit having more information to be processed, and the later arriving data unit having less information not to be processed by the processor. That data unit may be dropped or may be forwarded to a different node.

In one embodiment, each data unit d[l] includes a greater amount of information than any other data unit d[m], if index I is smaller than index m. The forwarder may be adapted to adjust the loading parameter such that data units d[0] through d[k−1] are forwarded to the processor and the data units d[k] through d[N−1] are dropped. The value of k is determined according to the loading parameter, and by adjusting the loading parameter the number of data units to be processed can be adjusted.

In some embodiments, the processor includes a number of sub-processors. A number of processing elements can also be configured as sub-processors forming the processor. The data channel may include memory configured as a queue, and the information channel may include memory configured as a hash table.

In another aspect, various embodiments feature an article of manufacture, a method and/or a system that facilitate load balancing at different levels. The system includes a number of levels, and each level includes a set of processors, a set of forwarders, a set of data channels, and a set of information channels. Each data channel is adapted for forwarding data from a corresponding forwarder within the set of forwarders at that level to a corresponding processor within the set of processors at that level. Each information channel is adapted for providing feedback to a corresponding forwarder from one or more processors at any level. Thus, a forwarder may receive feedback only from the corresponding processor, or in addition, from other processors at the same level. Alternatively or in addition, the forwarder may receive feedback from one or more processors at one or more other levels. Each forwarder is adapted for: (i) selectively directing data to the corresponding processor according to a loading parameter associated with the forwarder, (ii) receiving feedback from a corresponding processor, and (iii) adjusting the associated loading parameter based on, at least in part, the received feedback.

One or more processors within the set of processors at a first level include a parameter (e.g., processor type, capacity, speed) that is lacking in or has a different value than at least one processor within the set of processors at a second level. For example, in one embodiment the system includes four levels. One or more processors at the first level include or consist essentially of a core; one or more processors at the second level include or consist essentially of a central processing unit (CPU); one or more processors at a third level include or consist essentially of a host computer; and one or more processors at a fourth level include or consist essentially of a local network.

In another aspect, various embodiments feature an article of manufacture, a method and/or a system that facilitate processing a number of flows. The system includes a number of processing elements and a memory. A first processing element is configured to compute an index into a structure stored in memory. The structure can be a table, list, heap, etc. The computed index is based on, at least in part, a unique ID of the flow and a property of the structure.

The first processing element is also configured to store a value in the structure at the location identified by the index. The stored value corresponds to the unique flow ID, and the value is stored if a specified condition associated with the flow is satisfied. The storing operation includes or consists essentially of an atomic operation, so that the entire structure or a portion thereof need not be locked if two or more processing elements simultaneously store values in the structure.

A second processing element within the number of processing elements is configured to compute a value corresponding to the unique flow ID and the index, and to compare the computed value with the value stored at the location identified by the index. Typically, these values may match if a value associated with the flow were previously stored in the structure, which would have occurred if the condition associated with the flow were determined to be satisfied. The second processing element is also adapted to control processing of the flow based on, at least in part, a result of the comparison. For example, if the comparison is true, implying that the condition associated with the flow was satisfied, the second processing element may take one action, and if the comparison is false, the second processing element may take a different action. In some embodiments, the second processing element is further configured to read the value stored at the location identified by the index from the structure.

In some embodiments, the structure includes a table, and the property of the structure includes a size of the table. The second processing element may be further configured to compute the value corresponding to the unique flow ID at least in part by computing a hash value based on the unique flow ID.

The specified condition may include an indication that the flow is not to be processed, and the second processing element may be further configured to control processing of the flow, at least in part by directing processing of the flow if the indication is false and by dropping the flow if the indication is true. The flow may be forwarded to the first processing element for processing. As an alternative to dropping, the flow may be forwarded, with or without transformation, to another processing element within and/or outside the system. The first processing element may include a processor of a cell and the second processing element may include a forwarder of the cell. In some embodiments, the first processing element is configured to store the value associated with the flow simultaneously with the comparison being performed by the second processing element, without locking the structure.

A third processing element within the number of processing elements may be configured to additionally compute another index into the structure stored in the memory. The other index is based on, at least in part, a unique ID of another flow and the property of the structure. The third processing element is also configured to additionally store, as an atomic operation, a value in the structure at the location identified by the other index, if a specified condition associated with the other flow is satisfied. The stored value corresponds to the unique flow ID of the other flow. The first processing element may be configured to store simultaneously with the additional storage performed by the third processing element, without locking the structure.

Various embodiments of methods perform the operations performed by the embodiments of systems described above. Various embodiments of articles of manufacture include a non-transitory machine-readable medium storing instructions that, when executed by a machine, can configure a system including one or more processing elements and/or one or more communication links to perform the operations performed by the embodiments of systems described above.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Figure 1:
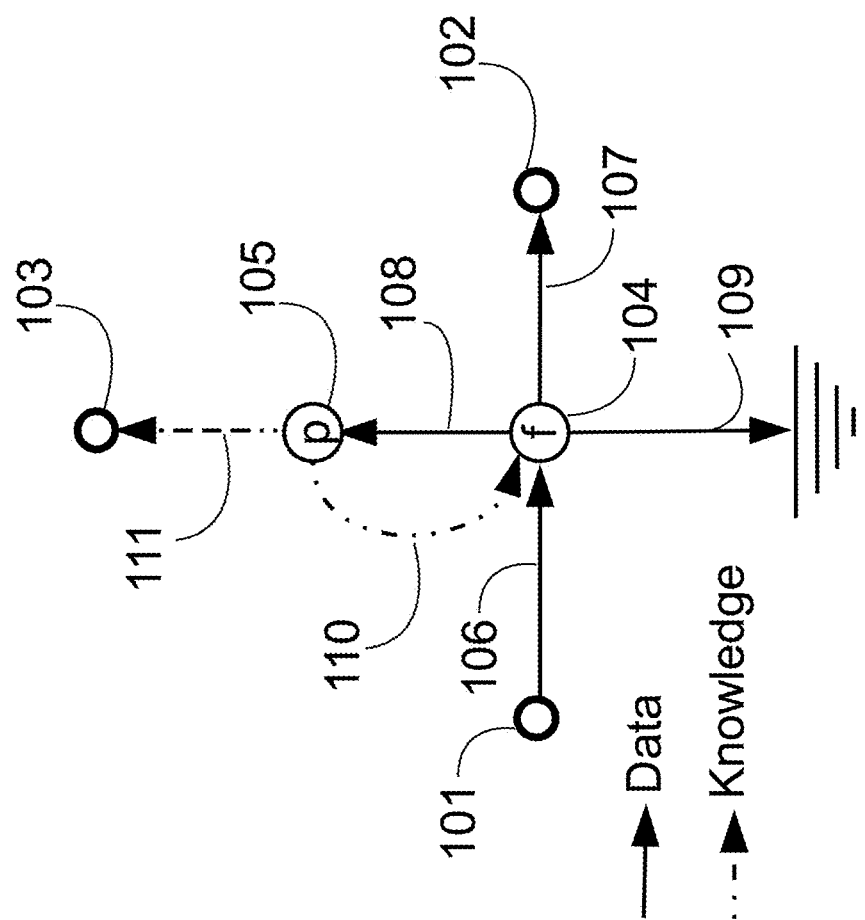
FIG. 1 illustrates a general configuration of an information processing cell, according to one embodiment.
Figure 2:
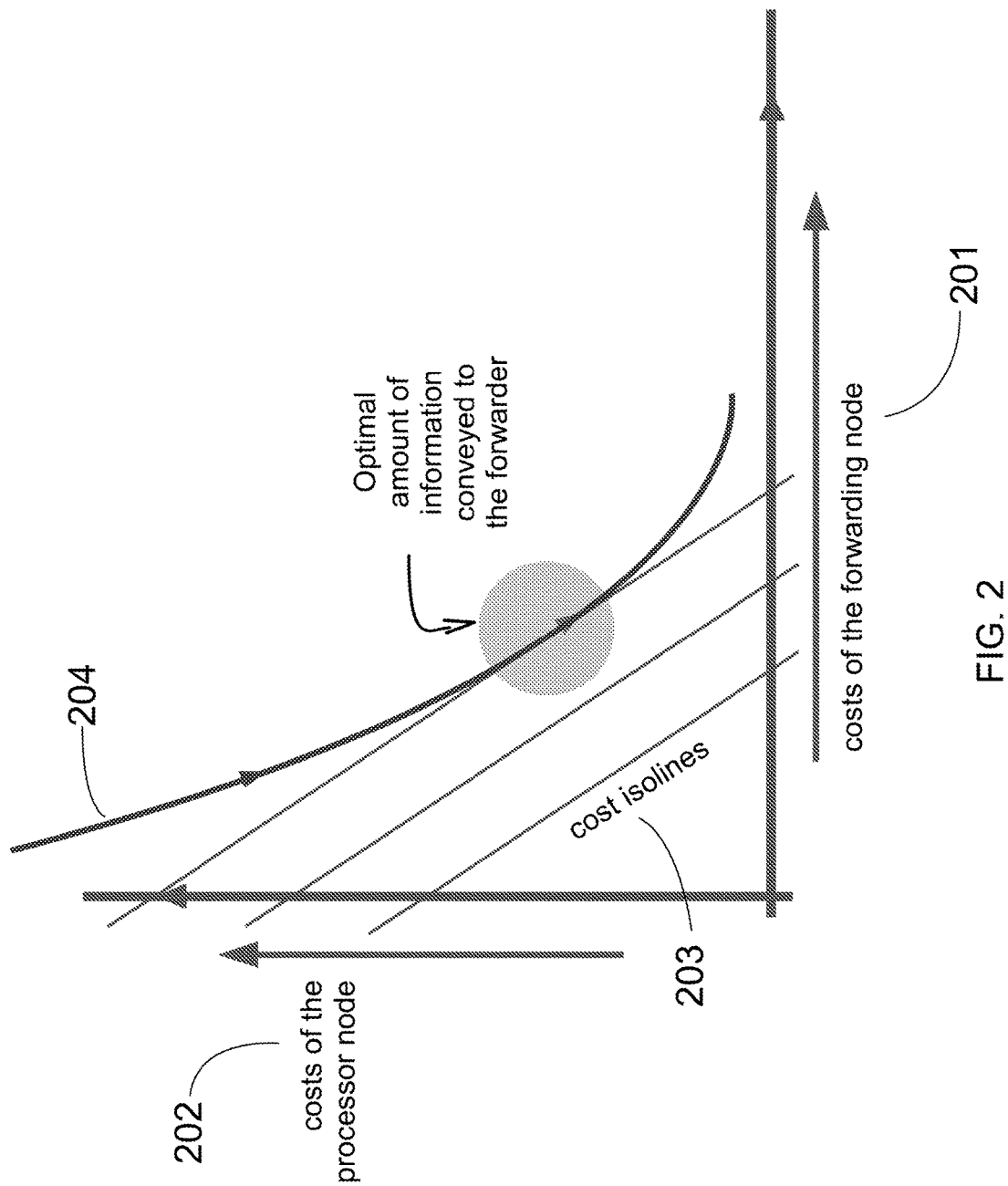
FIG. 2 illustrates a set of possible trade-offs presented according to different configurations of an information processing cell according to one embodiment.

Referring to FIG. 1, which illustrates an exemplary embodiment of a basic information processing cell consisting of a forwarder 104, a processor 105, four data plane channels 106-107-108-109 and two information plane channels 110-111. The input to the cell being a stream of data 101 and the outputs being another stream of data 102 and a stream of information 103. In this context, data and information are understood in the following sense: we will refer to data as the complete set of raw signals that are transmitted between information processing cells, regardless of whether portions of these signals are relevant or not to the processor; and we will refer to information as the output generated by the processor obtained from transforming the pieces of data that are relevant to it.

In one embodiment, the input stream of data 101 can take any format, including but not limited to, a spoken conversation, an analog electromagnetic signal, digital Internet Protocol-based packets, etc.; the output stream of data o_d 102 is a function f_d( ) of i, o=f_d(i); and the output stream of information o_i 103 is a function f_i( ) of i, o_i=f_i(i).

The forwarder is responsible for receiving data and deciding how this data is forwarded. Its forwarding decision can be based on information received from information channel 110. Upon receiving a piece of data d, the forwarder can decide to:

Forward d or a copy of it to data channel 107 while applying a function f_d( ) to d.

Forward d or a copy of it to data channel 108.

Drop d by forwarding it to data channel 109.

The processor is responsible for receiving data from data channel 108 and processing the data to extract information from it by applying function f_i( ) Upon extracting a new piece of information i, the forwarder can decide to:

Forward i or a copy of it to information channel 110.

Forward i or a copy of it to information channel 111.

In this embodiment, the division of labor between the forwarder and the processor is as follows:

The forwarder has the capability to move data between any pairs of data channels but it does not have the capability to extract information from data.

The processor has the capability to extract information from data but it does not have the capability to move data between any pairs of data channels.

Figure 3:
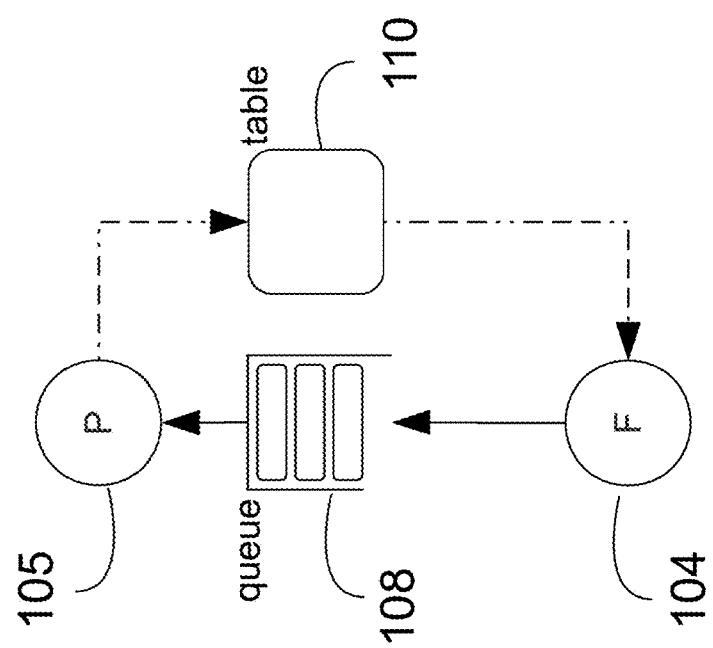
FIG. 3 depicts an embodiment of the information processing cell using a queue and a table data structure as data and information channels, respectively, according to one embodiment.

In some embodiments, as shown in FIG. 3, the data plane communication channel 108 can be implemented using a queue and the information plane communication channel 110 can be implemented using a table data structure.

Figure 4:
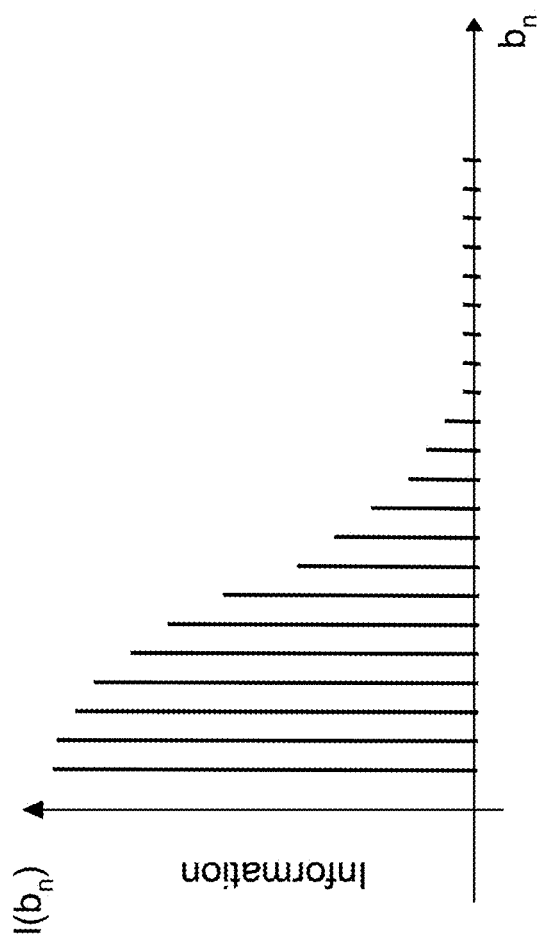
FIG. 4 illustrates a heavy tail of a network flow, according to one embodiment.

Under congestion scenarios where the rate of the input data is higher than the processing capacity of the processor, it is unavoidable that some portions of the data will need to be dropped. In one embodiment, the data plane communication channel 108 is implemented using a queue which takes proactive measures in dropping portions of the data so as to avoid reaching such congestion scenarios. In particular, the queue can exploit the property of heavy tails which is often found in communication systems. Such property works as follows. Data is first assumed to be grouped into flows—for instance, a person skilled in the art can recognize that in the field of computer networks, examples of flows can be TCP/IP or UDP/IP connections. As some authors have identified, (Jose Gonzalez, Vern Paxson, Nicholas Weaver, Shunting: A Hardware/Software Architecture for Flexible, High Performance Network Intrusion Prevention, ACM Conference on Computer and Communications Security, November 2007), information inside such flows is generally not equally distributed. In particular, assume without loss of generality that data takes the format of a stream of bytes, let b_n be the n-th byte transmitted in a given flow and let l(b_n) be the amount of information carried by such byte; then, it is often the case that l(b_n) is a monotonically decreasing function with a heavy tail as illustrated in FIG. 4. This heavy tail nature of the data presents optimization opportunities as described next.

Figure 5:
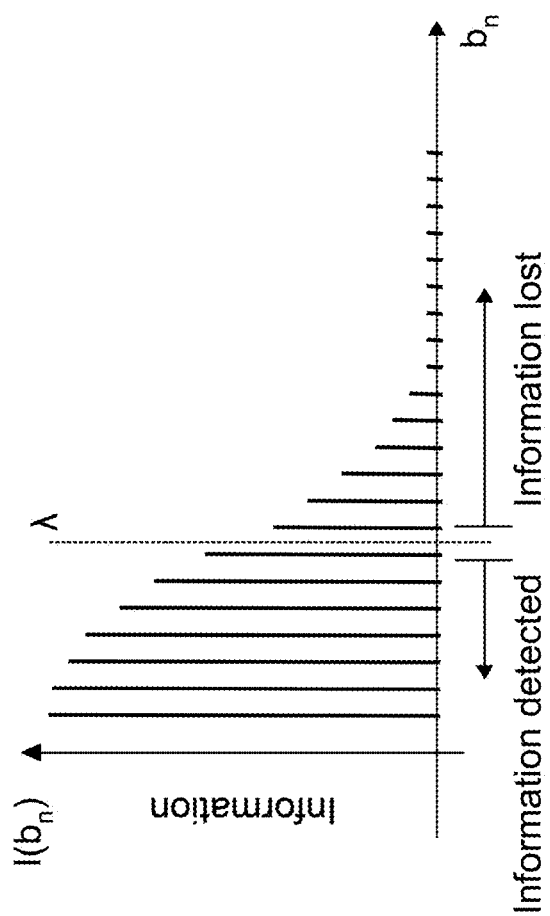
FIG. 5 illustrates cutting the tail of a heavy tail flow, according to one embodiment.

FIG. 5 provides additional detail on one exemplary embodiment of the data plane communication channel 108. Let $\lambda$ be a positive number and assume without loss of generality that input data is formatted as a stream of bytes. Then, in such embodiment, the queue is ruled by the following proactive procedures:

1. Upon receiving byte n-th of a flow:
1.1. If n>$\lambda$ drop the byte 109, otherwise forward it into the queue 108;
2. Periodically, schedule the following actions:
2.1. If the cell is congested, keep decrementing $\lambda$ until the cell is not congested;
2.2. Otherwise, increment $\lambda$ a certain positive amount;

The above algorithm is herein referred as the tail-early dropping (TED) algorithm. The name stems from the fact that to prevent congestion, the algorithm prioritizes those bytes that are on the front of the tail of each flow, which carry the highest information according to the heavy tail principle. Such strategy aims at maximizing the value of the data passed to the processor from an information perspective. A person skilled in the art of information theory will also recognize the above algorithm as a strategy to help maximize the entropy of the system, since higher levels of information are associated with higher levels of entropy.

The above TED algorithm should be understood as a general queuing policy that maximizes the amount of information conveyed to the processor, regardless of the format it takes. For instance, when data cannot be represented in terms of a stream of bytes, the notion of the n-th byte of a flow can be exchanged by the more general concept of duration. Using such interpretation, the parameter $\lambda$ would refer to the time in which a flow has existed for more than $\lambda$ units of time. Likewise, the decrementing and incrementing functions used in steps 2.1 and 2.2 can be generally implemented following a variety of strategies. In one specific embodiment, a queue can decide to take a more aggressive step in decrementing the value of $\lambda$ than in incrementing it—for instance, by decrementing the value using an exponentially decaying function and incrementing it using a linear function; such strategy would be considered conservative in that it would help reduce the risks of reaching congestion at the expense of dropping potentially valuable information.

Figure 6:
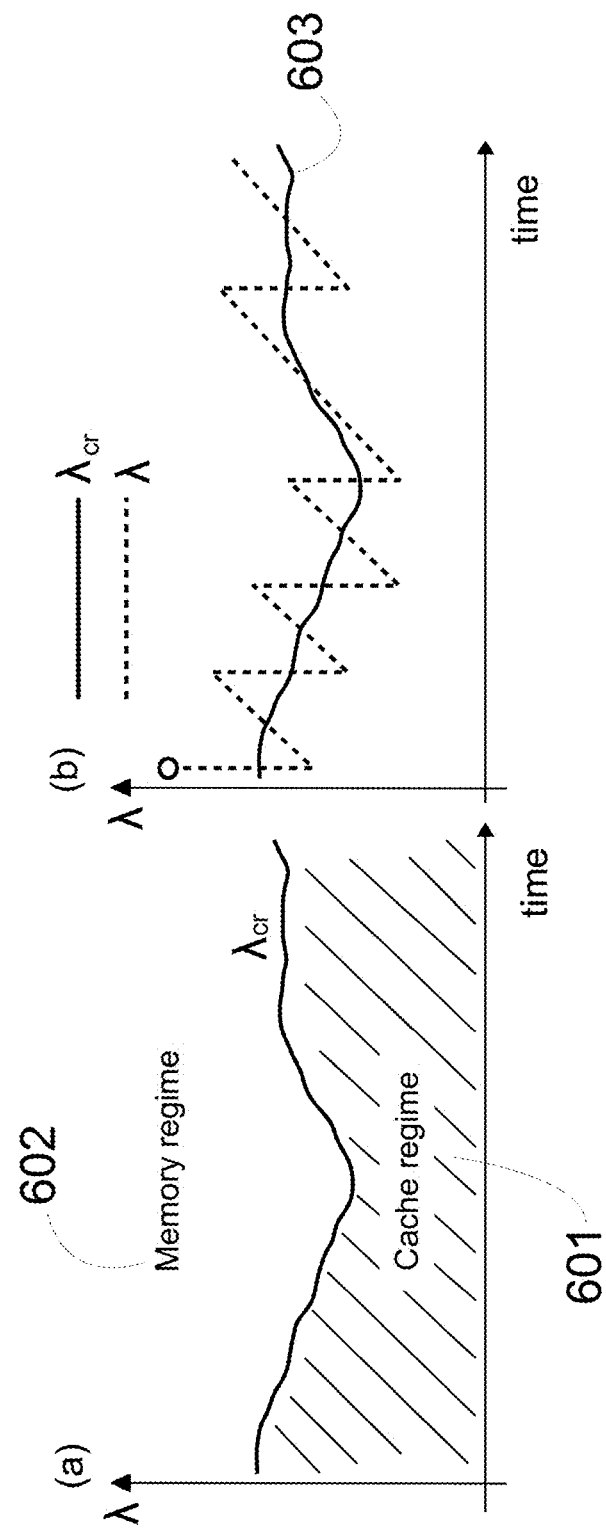
FIG. 6 illustrates an embodiment of a Tail Early Dropping (TED) queuing method, while tracking the theoretical optimal TED threshold.

In one specific embodiment, if the memory system of the processor is implemented using a standard hierarchical architecture, the TED queuing algorithm can be used to help stabilize the system towards operating in a higher performance regime, as illustrated in FIG. 6. Without loss of generality, such systems can be modeled as operating in two different regimes: a cache regime 601 in which data fetch by the processor is with high probability found in its local cache; and a memory regime 602 in which data fetch by the processor is with high probability not found in the cache and hence it has to be fetch from main memory, incurring a performance penalty. The TED queuing algorithm can be used to steer the system towards operating inside a cache regime through the following procedure: if the system operates under a memory regime, the processor's performance will tend to be degraded due to extra latencies in fetching data from memory (rather than cache), increasing the chances of congestion; as the system reaches congestion, the TED queuing algorithm in step 2.1 reduces its threshold A; such reduction will continue until the congestion is resolved, at which point the system is more likely to operate in a cache regime. In this configuration, the TED queuing algorithm provides a strategy to track the value of a theoretical $\lambda_{cr}$ 603 defined as the maximum value that A can take while still operating under a cache regime.

The TED queuing algorithm can be understood as a queuing policy which effectively prioritizes packets based on the heavy tails principle. In one embodiment, such technique can be used to optimize the performance of an information processing system dedicated to the extraction of cyber-security information. In this context, it is known that on average, flows carry more cyber-security relevant information on the head of a flow than on a tail. It is for instance on the head of a flow that information such as the source and destination, the type of communication, and most of the metadata related to that flow is conveyed. The main principle behind the TED algorithm is that under heavily congested scenarios, on average the system is better off dropping packets from the tail rather than the head of a flow.

Figure 7:
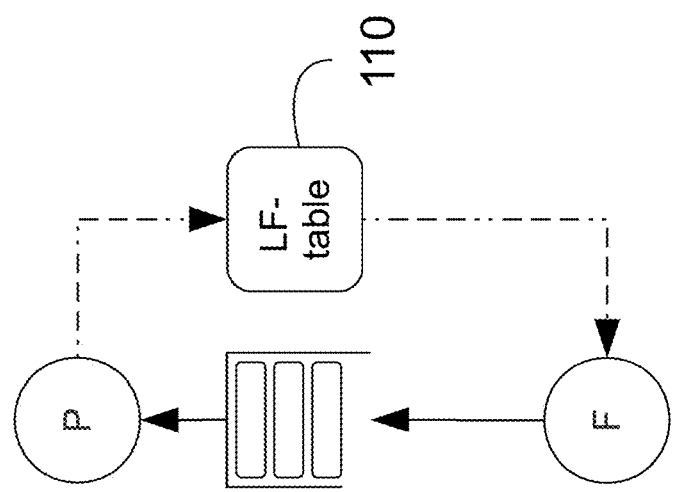
FIG. 7 illustrates an embodiment of an information processing cell using a LF- table as the information channel.

Various embodiments are also provided for the implementation of the information plane channel 110. In scenarios in which the processor is implemented using multiple parallel sub-processors, the writing of feedback information into such information plane channel 110 by such sub-processors needs to generally be done in a synchronized manner to avoid the corruption of the channel. In one embodiment, depicted in FIG. 7, the communication channel 110 is implemented using a data structure with the following properties:

Each row of the table corresponds to one and only one flow from the input stream of data;
Each row provides some type of state about the flow it represents.
The data structure can be concurrently written and read by multiple writers and multiple readers but it does not require locks to preserve the correctness of its elements.
It can tolerate a low probability of false negatives but not false positives.

We will refer to this data structure as the lock-free/low false negatives table or the LF- table.

In one embodiment, such table can be used to track the status of a flow, marking each flow with a binary value ON or OFF. For instance, such information can be used to inform the forwarder about which flows need to be dropped 109 and which need to be forwarded 107-108. In general, any condition may be associated with a flow, and based on whether the condition is true or false, the flow can be processed, e.g., processed by a processing element, transformed, forwarded to another processing element, dropped, and a combination of two or more of these operations.

Let id(c) be a unique identifier of a flow c and h( ) a hash function that takes as input a flow identifier and returns as output an integer. Let T[ ] be a one-dimensional table storing N integers. The write and read operations of the LF- table are done according to the following procedure:
Initial state: T[e]=NULL for all e such that 0≤e<N;

Writer procedure:
  Upon detecting that c needs to be dropped, do:
    $T[h(id(c))\ \text{modulo}\ N] = h(id(c))$;
The above write operation is an atomic operation, allowing simultaneous write operations to different locations within the table, without having to lock the table for any one write operation. As used herein, simultaneously does not mean exactly at the same time, but within a duration of a single processor clock cycle.

Reader procedure:
  Upon receiving a packet from flow c, do:
    If $T[h(id(c))\ \text{modulo}\ N] == h(id(c))$
      Return ON;
    Otherwise
      Return OFF;

The number of entries N, or the size of the table T, is a property thereof. In general, any suitable function that maintains various probabilities as described below, and facilitates atomic write operations can be used. The modulo N is also illustrative, and other methods of computing an index into a table are within the scope of the present invention.

It can be demonstrated that an element in a data structure constructed using the LF− procedure above is in a positive state with probability $p_t$, in a false negative state with probability $p_{fn}$, and in a false positive state with probability $p_{fp}$, where $p_{fp} \ll p_{fn} \ll p_t$ and $p_t \approx 1$. A person skilled in the art will be able to verify the correctness of the LF− data structure by constructing the following procedure.

Figure 8:
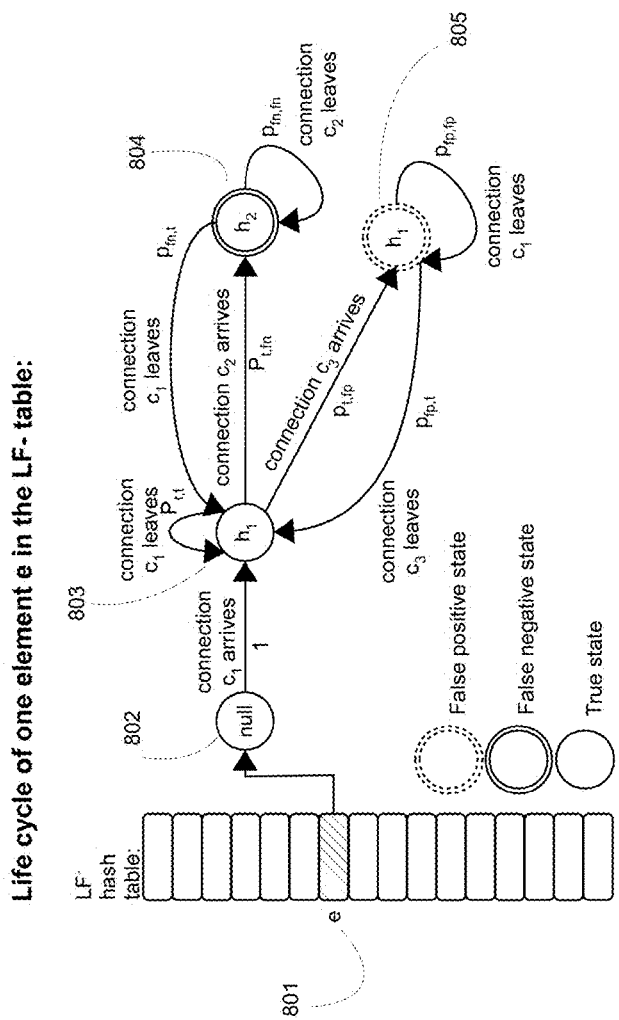
FIG. 8 illustrates a life cycle of an entry in a LF- data structure, indicating which states are false positives, false negatives, and true states; according to one embodiment.

Let e be an entry in the LF− table and consider through the following process the set of all possible states for element e along with the probability of such states and throughout all possible paths in its life cycle. FIG. 8 shows the set of possible transitions amongst all possible states of element e (true, false negative and false positive). We use the notation $p_s$ to denote the probability that the next change of state leads to state s and $p_{s_1,s_2}$ to denote the probability of changing to state $s_2$ conditioned that our current state is $s_1$.

Element e starts with a NULL 802 value, $T[e]=\text{NULL}$. Assume that a processor wants to mark a flow $c_1$ as ON and assume that $h(id(c_1))\ \text{mod}\ N$ is equal to e. Then per the writer algorithm, we have that $T[e]=h_1$, where $h_1=h(id(c_1))$. This state is a true state 803 as entry e stores a flow that is marked as ON. Now there exist only three events that can affect the state of e, each with a different probability of occurrence: $p_{t,t}$, $p_{t,fn}$ and $p_{t,fp}$, where $p_{t,t}+p_{t,fn}+p_{t,fp}=1$. We have that these three events are:

With a probability $p_{t,t}$, flow $c_1$ is no longer present in the cell. In this case, the value of $T[e]$ continues to be $h_1$, but this state is still a true state 803 because there is no flow in the system whose identifier hashes into element e.

With a probability $p_{t,fn}$, a new flow $c_2$ arrives to the cell and the processor needs to mark it as ON, with $h(id(c_2))\ \text{mod}\ N=e$ and $h_2=h(id(c_2))\neq h(id(c_1))$. Then, we have that $T[e]=h_2\neq h_1$. This state generates a false negative 804 because flow $c_1$ ought to be dropped but the reader will not find it in the table.

With a probability $p_{t,fp}$, a new flow $c_3$ arrives which needs to be marked as OFF, with $h(id(c_3))\ \text{mod}\ N=e$ and $h(id(c_3))=h(id(c_1))$. Then, we have that $T[e]=h_1=h_3$. This state generates a false positive 805 because flow $c_3$ will be dropped.

Based on the above, a person skilled in the art will recognize that:

$p_{t,fn} \ll 1$, because $p_{t,fn}$ corresponds to the collision probability of the hash function. While this probability is not negligible, it is much smaller than 1.

$p_{t,fp} \ll p_{t,fn}$, because $p_{t,fp}$ corresponds to the probability of two flows yielding the exact same hash value. (Notice that this probability is much smaller than the probability of a hash collision $p_{t,fn}$; that is because the size of the table is relatively much smaller than the size of the hash value space.)

Since $1=p_{t,t}+p_{t,fn}+p_{t,fp}$, it must be that $p_{t,t}\approx 1$.

FIG. 8 represents a simplification in that, in principle, there ought to be further possible false negative and positive states coming out from the two double-circle states 804-805. However, the probability of reaching such states diminishes geometrically and, for the sake of simplifying the analysis, we will consider them negligible.

The equations that rule the life cycle of one element in the LF− table are as follows. First, for each state, the sum of the probabilities of all possible events must add up to one:

$$\begin{cases} 1 = p_{t,t} + p_{t,fn} + p_{t,fp} \\ 1 = p_{fn,fn} + p_{fn,t} \\ 1 = p_{fp,fp} + p_{fp,t} \end{cases} \quad (1)$$

Then, the probabilities of going into each of the states can be calculated using the law of total probability as follows:

$$\begin{cases} p_t = p_t p_{t,t} + p_{fn} p_{fn,t} + p_{fp} p_{fp,t} \\ p_{fn} = p_t p_{t,fn} + p_{fn} p_{fn,fn} \\ p_{fp} = p_t p_{t,fp} + p_{fp} p_{fp,fp} \end{cases} \quad (2)$$

Finally, the sum of the probabilities of all possible states must add up to one:

$$1 = p_t + p_{fn} + p_{fp} \quad (3)$$

Working out the algebra, we get:

$$p_t \approx \frac{1}{\left(1 + \frac{1 - p_{t,t}}{p_{fn,t}}\right)} \quad (4)$$

$$p_{fn} \approx \frac{p_{t,fn}}{(1 - p_{fn,fn})} \quad (5)$$

$$p_{fp} \approx \frac{p_{t,fp}}{(1 - p_{fp,fp})} \quad (6)$$

Since $p_{t,fp} \ll p_{t,fn} \ll p_{t,t}$, we have that $p_{fp} \ll p_{fn} \ll p_t$ and $p_t \approx 1$.

In one embodiment, the LF− data structure is used to help optimize the workflow of processors performing cyber-security analysis on the input data. In this context, a common scenario is one in which a cyber-security analytic does no longer require to receive packets of a given flow. Among other reasons, this could be for instance because it no longer deems such flow to carry relevant information, or because it no longer knows how to process it (for instance, if the flow is encrypted). In one specific embodiment, the processors can use the LF− table to communicate a "PLEASE DO NOT FORWARD PACKETS FROM THIS FLOW TO ME ANYMORE" message to the forwarders. The forwarder would find such message encoded in the form of a binary flag stored in the LF– table and stop forwarding packets of that flow to the forwarder via the data plane channel 108.

Figure 9:
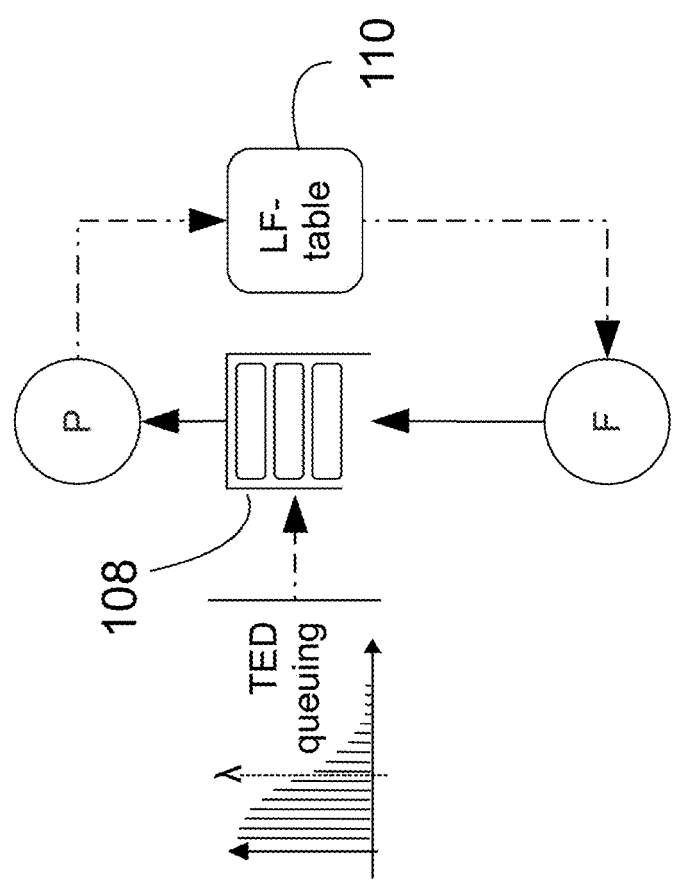
FIG. 9 illustrates a configuration of TED queuing and the LF- data structure in an information processing cell to help optimize the cell's internal workflow, according to one embodiment.

As shown in FIG. 9, one TED queue and one LF– table can be used in conjunction to optimize the overall workflow within one information processing cell. Upon receiving data, the forwarder uses feedback information from the LF– table to make data forwarding or dropping decisions. The forwarder passes data to the processor via the TED queue, which under congestion scenarios takes a proactive role in dropping tails with little information or entropy. The processor receives the data, processes it, extracts information, and conveys part of it back to the LF– table so that the forwarder can use it to optimize its forwarding decisions, completing a full cycle of data and information flow.

We now turn to the problem of scaling up or down the performance of one information processing system by using information processing cells as building blocks. Consider the following simple processing model:

1. Sets of data $D=\{d_1, d_2, \ldots d_n\}$ that enter the system and leave after they are processed;
2. Sets of cells $C=\{c_1, c_2, \ldots c_n\}$ capable of processing data;
3. A mapping m( ) of data sets onto cells:

$$m: D \to C$$

$$d_i \to c_j = m(d_i) \qquad (7)$$

4. The following procedure running in an infinite loop:
   For each data $d_i \in D$ entering the system, assign $d_i$ to $c_j = m(d_i)$ and let $c_j$ process $d_i$.

To maximize the performance of the system, the mapping function m( ) ought to be designed according to some optimization criterion. Since this optimization criterion will generally depend on the state of the system learned throughout time, an optimal mapping $m_{opt}(\ )$ of tasks can be generally expressed as follows:

$$m_{opt}: D \to C$$

$$d_i \to c_j = m_{opt}(d_i, K) \qquad (8)$$

where K is a parameter reflecting the accumulated information gained by the system through the processing of data sets.

Figure 10:
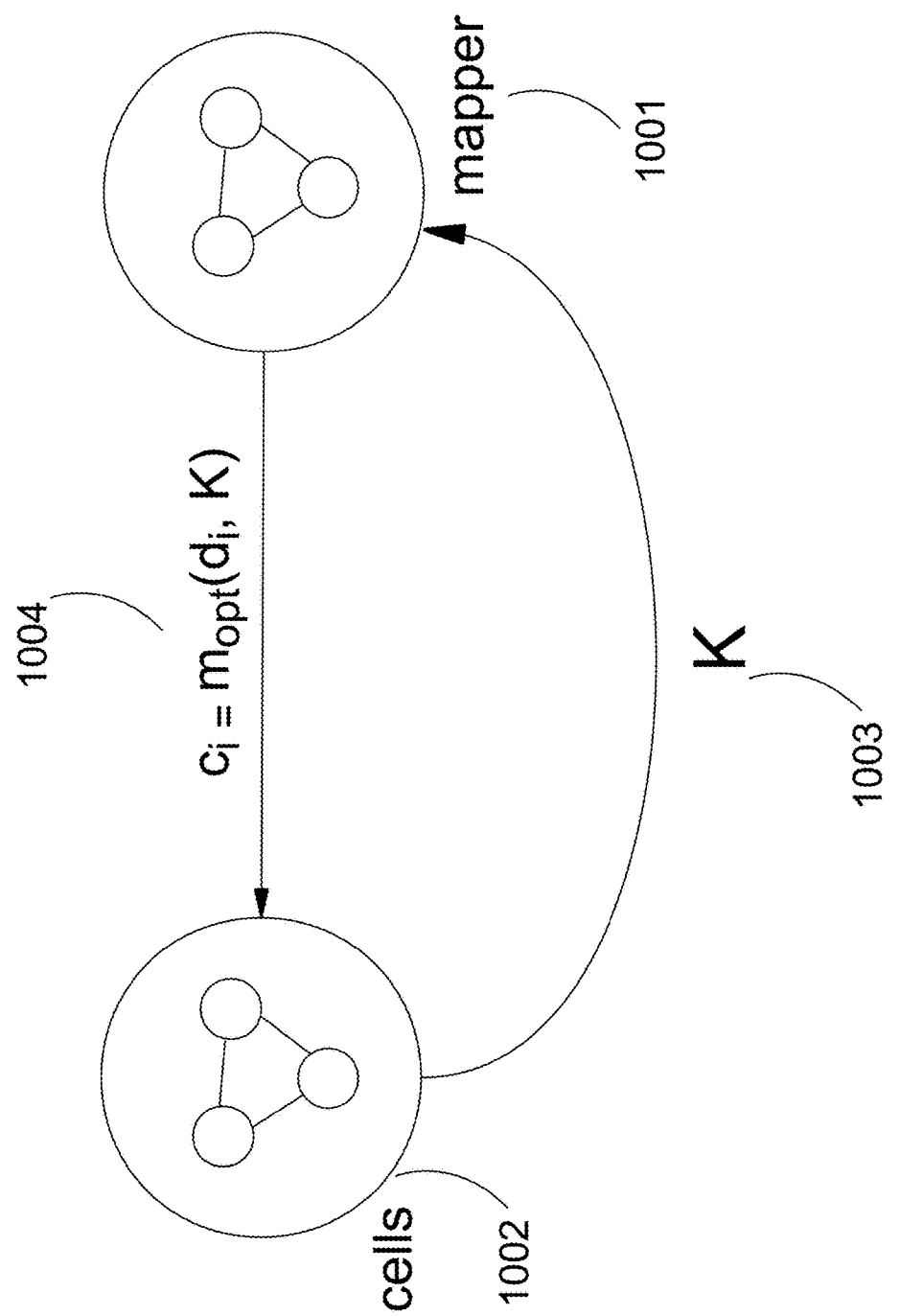
FIG. 10 provides a logical interpretation of an information processing system understood as an optimization process of mapping data onto cells.

FIG. 10 provides a graphical representation of the mapping function $m_{opt}(\ )$, consisting of two nodes (the mapper and the cells) connected by a closed-loop which implements the feedback parameter K.

From a functional perspective, FIG. 10 is identical to FIG. 1, with the roles of the forwarder 104 and the processor 105 taken by the mapper 1001 and the cells 1002.

Figure 11:
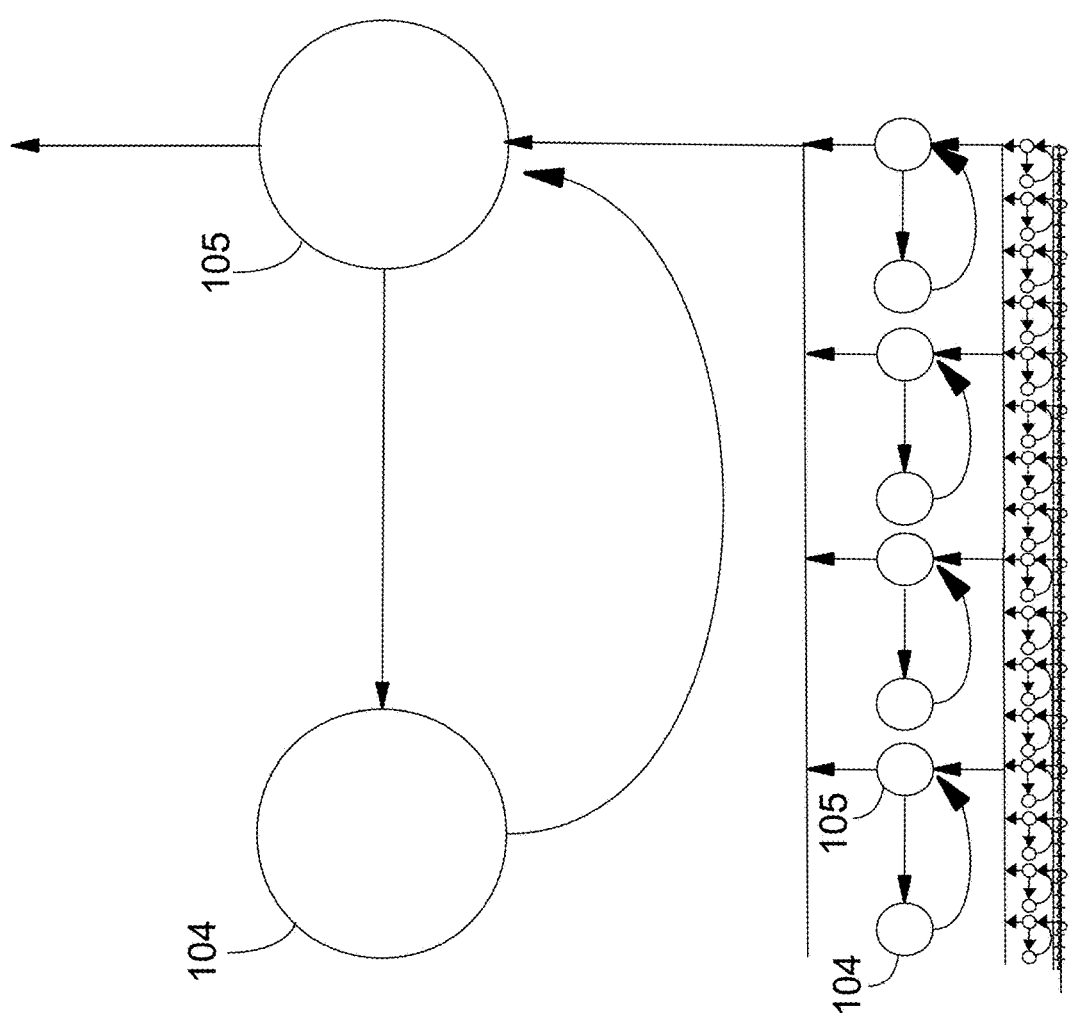
FIG. 11 illustrates an information processing system using a fractal (e.g., multi-level) architecture.

Consider now the problem of scaling up the performance of the system in FIG. 10. To attain higher degrees of performance, the mapper and the cells will need to be decomposed into smaller elements. These elements will need to resolve on their own the same original mapping problem between data sets and cells. Applying the same original principle, their internal optimal mapping will also depend on the information gained through the processing of data sets. This iterative process leads to a fractal-like architecture, with every level exposing the same properties of the level above, albeit at a smaller scale. An example of this recursive view of the system is illustrated in FIG. 11, for a system with four levels.

Using this technique, an arbitrary number of information processing cells can be connected with each other to form a larger processing system. At each level, the system is identical to the single information processing cell described in another embodiment. Each cell can process data to generate new pieces of information, and at the same time it can forward data to other cells based on information gained from the data itself. Cells operate independently but in a manner that the overall performance of the system is maximized.

In one specific embodiment, one information processing system is composed of four fractal levels using cores, CPUs, hosts and networks, via the following configuration:

Cores: Multiple cores in a single CPU forming one information processing cell. Data and information are shared/forwarded via main memory or cache.

CPUs: Multiple CPUs in a single host forming one information processing cell. Data and information are shared/forwarded via a CPU interconnect (for instance, a PCI bus).

Hosts: Multiple Hosts in a single local network forming one information processing cell. Data and information are shared/forwarded via a local network interconnect (for instance, a switch).

Local networks: Multiple networks in a single wide area network forming one information processing cell. Data and information are shared/forwarded via a wide area network interconnect (for instance, a router).

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. References to structures includes links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, we claim:

1. A cell for load balancing, the cell comprising:
   a processor;
   a forwarder;
   a data channel; and
   an information channel for receiving feedback at the forwarder from the processor,
   the forwarder being adapted to: (i) (A) forward data to the processor via the data channel, (B) transform the data and forward transformed data to a node different from the processor, and (C) drop the data, according to a loading parameter of the cell, (ii) selectively direct the data from the forwarder by choosing between directly forwarding the data to the processor, transforming modified data to the node different from the processor, and dropping the data, and (iii) adjust the loading parameter based on, at least in part, the received feedback.

2. The cell of claim 1, wherein the forwarder is adapted to adjust the loading parameter by at least one of: (i) decreasing the loading parameter to cause reduction in congestion at the processor, and (ii) increasing the loading parameter to cause increase in an amount of information processed at the processor.

3. The cell of claim 1, wherein the forwarder is adapted to:
   receive a flow, the flow comprising a sequence of N data units indexed from [0, N−1], each data unit comprising an amount of information, at least one data unit d[i] comprising a greater amount of information than a data unit d[j] such that index i is smaller than index j; and
   adjust the loading parameter such that the data unit d[i] is forwarded to the processor and the data unit d[j] is not forwarded to the processor.

4. The cell of claim 3 wherein:
   each data unit d[l] comprises a greater amount of information than a data unit d[m] if index l is smaller than index m; and
   the forwarder is adapted to adjust the loading parameter such that data units d[0] through d[k−1] are forwarded to the processor and the data units d[k] through d[N−1] are dropped.

5. The cell of claim 1, wherein the processor comprises a plurality of sub-processors.

6. The cell of claim 1, wherein the data channel comprises memory configured as a queue.

7. The cell of claim 1, wherein the information channel comprises memory configured as a hash table.

8. A system comprising a plurality of levels, each level comprising:
   a plurality of processors;
   a plurality of forwarders;
   a plurality of data channels, each data channel being adapted for forwarding data from a corresponding forwarder within the plurality of forwarders to a corresponding processor within the plurality of processors; and a plurality of information channels, each information channel being adapted for providing feedback to a corresponding forwarder from one or more processors at any level, wherein each forwarder is adapted for: (i) selectively directing data to the corresponding processor according to a loading parameter associated with the forwarder, (ii) receiving feedback from a corresponding processor, and (iii) adjusting the associated loading parameter based on, at least in part, the received feedback, wherein at least one processor within the plurality of processors at a first level comprises a parameter that is lacking in or has a different value than at least one processor within the plurality of processors at a second level.

9. The system of claim 8, wherein:
the plurality of levels comprises four levels;
at least one processor at the first level comprises a core;
at least one processor at the second level comprises a central processing unit (CPU);
at least one processor at a third level comprises a host; and
at least one processor at a fourth level comprises a local network.

10. A method of balancing a cell, the method comprising the steps of:
at a forwarder adapted to, according to a loading parameter of the cell: (A) forward data to a processor via a data channel, (B) transform the data and forward transformed data to a node different from the processor, and (C) drop the data, selectively directing the data to a processor via the data channel, the selective directing being based on, at least in part, a loading parameter of the cell, and comprises selecting from: (A) forwarding the data to the processor, (B) transforming the data and forwarding transformed data to a node different than the processor, and (C) dropping the data;
analyzing at the forwarder feedback from the processor, the feedback being received via an information channel; and
adjusting at the forwarder the loading parameter, based on, at least in part, the received feedback.

11. The method of claim 10, wherein the adjusting step comprises at least one of: (i) decreasing the loading parameter to cause reduction in congestion at the processor, and (ii) increasing the loading parameter to cause increase in an amount of information processed at the processor.

12. The method of claim 10, further comprising:
receiving a flow at the forwarder, the flow comprising a sequence of N data units indexed from [0, N−1], each data unit comprising an amount of information, at least one data unit d[i] comprising a greater amount of information than a data unit d[j] such that index i is smaller than index j;
wherein the loading parameter is adjusted such that the data unit d[i] is forwarded to the processor and the data unit d[j] is not forwarded to the processor.

13. The method of claim 12 wherein:
each data unit d[l] comprises a greater amount of information than a data unit d[m] if index l is smaller than index m; and
the loading parameter is adjusted such that data units d[0] through d[k−1] are forwarded to the processor and the data units d[k] through d[N−1] are dropped.

14. The method of claim 10, wherein the processor comprises a plurality of sub-processors.

15. The method of claim 10, wherein the data channel comprises memory configured as a queue.

16. The method of claim 10, wherein the information channel comprises memory configured as a hash table.

17. A method of balancing cells at a plurality of levels, each level comprising: (i) a plurality of processors, (ii) a plurality of forwarders, (iii) a plurality of data channels, each data channel being adapted for forwarding data from a corresponding forwarder within the plurality of forwarders to a corresponding processor within the plurality of processors, and (iv) a plurality of information channels, each information channel being adapted for providing feedback to a corresponding forwarder from one or more processors at any level, the method comprising, at each level, at each forwarder:
selectively directing data to the corresponding processor according to a loading parameter associated with the forwarder;
receiving feedback from a corresponding processor; and
adjusting the associated loading parameter based on, at least in part, the received feedback,
at least one processor within the plurality of processors at a first level comprising a parameter that is lacking in or has a different value than at least one processor within the plurality of processors at a second level.

18. The method of claim 17, wherein:
the plurality of levels comprises four levels;
at least one processor at the first level comprises a core;
at least one processor at the second level comprises a central processing unit (CPU);
at least one processor at a third level comprises a host; and
at least one processor at a fourth level comprises a local network.

19. An article of manufacture, comprising a non-transitory machine-readable medium storing instructions that, when executed by a machine, configure:
a first processing element as a processor; and
a second processing element as a forwarder, the configured processor and the configured forwarder being in communication via a data channel, and an information channel for receiving feedback at the forwarder from the processor,
the instructions, when executed by the machine, further configure the forwarder to: (i) (A) forward data to the processor via the data channel, (B) transform the data and forward transformed data to a node different from the processor, and (C) drop the data, according to a loading parameter of the cell, (iii) selectively direct the data from the forwarder by choosing between directly forwarding the data to the processor, transforming modified data to the node different from the processor, and dropping the data, and (iii) adjust the loading parameter based on, at least in part, the received feedback.

20. The article of manufacture of claim 19, wherein the instructions further configure the forwarder to adjust the loading parameter by at least one of: (i) decreasing the loading parameter to cause reduction in congestion at the processor, and (ii) increasing the loading parameter to cause increase in an amount of information processed at the processor.

21. The article of manufacture of claim 19, wherein the instructions further configure the forwarder to:
receive a flow, the flow comprising a sequence of N data units indexed from [0, N−1], each data unit comprising an amount of information, at least one data unit d[i] comprising a greater amount of information than a data unit d[j] such that index i is smaller than index j; and adjust the loading parameter such that the data unit d[i] is forwarded to the processor and the data unit d[j] is not forwarded to the processor.

22. The article of manufacture of claim 21, wherein:
each data unit d[l] comprises a greater amount of information than a data unit d[m] if index l is smaller than index m; and
the instructions further configure the forwarder to adjust the loading parameter such that data units d[0] through d[k−1] are forwarded to the processor and the data units d[k] through d[N−1] are dropped.

23. The article of manufacture of claim 19, wherein the instructions configure a plurality of processing elements collectively operating as the processor comprising a plurality of sub-processors.

24. The article of manufacture of claim 19, wherein the data channel comprises a queue, and the instructions configure a memory as the queue.

25. The article of manufacture of claim 19, wherein the information channel comprises a hash table, and the instructions configure a memory as the hash table.

26. An article of manufacture, comprising a non-transitory machine-readable medium storing instructions that, when executed by a machine, configure, at each level within a plurality of levels:
a set of processing elements as a set of processors;
a set of processing elements as a set of forwarders;
a set of communication links as a set of data channels, each data channel being adapted for forwarding data from a corresponding forwarder within the set of configured forwarders to a corresponding processor within the set of configured processors; and
a set of communication links as a set of information channels, each information channel being adapted for providing feedback to a corresponding configured forwarder from one or more configured processors at any level,
the instructions configuring each forwarder to: (i) selectively direct data to the corresponding configured processor according to a loading parameter associated with the forwarder, (ii) receive feedback from a corresponding configured processor, and (iii) adjust the associated loading parameter based on, at least in part, the received feedback,
wherein at least one configured processor within the set of configured processors at a first level comprises a parameter that is lacking in or has a different value than at least one configured processor within the set of configured processors at a second level.

27. The article of manufacture of claim 26, wherein:
the plurality of levels comprises four levels;
at least one processing element at the first level comprises a core;
at least one processing element at the second level comprises a central processing unit (CPU);
at least one processing element at the third level comprises a host; and
at least one processing element at a fourth level comprises a local network.

* * * * *

UNITED STATES PATENT AND TRADEMARK OFFICE
CERTIFICATE OF CORRECTION

PATENT NO. : 9,798,588 B1
APPLICATION NO. : 13/870814
DATED : October 24, 2017
INVENTOR(S) : Jordi Ros-Giralt Page 1 of 1

It is certified that error appears in the above-identified patent and that said Letters Patent is hereby corrected as shown below:

In the Specification

Column 1, Lines 14-17, under the heading "GOVERNMENT INTERESTS" should read as follows:
-- This invention was made with government support under Award No. DE-SC0006343 and Award No. DE-SC0004400 awarded by the U.S. Department of Energy. The government has certain rights in the invention. --

Signed and Sealed this
Twelfth Day of July, 2022

Katherine Kelly Vidal
*Director of the United States Patent and Trademark Office*